US012585109B2

(12) United States Patent (10) Patent No.: US 12,585,109 B2
Jeon et al. (45) Date of Patent: Mar. 24, 2026

(54) HIGH-TEMPERATURE ENDOSCOPE PREVENTING IMPURITIES OF INGOT GROWTH APPARATUS FROM BEING DEPOSITED

(71) Applicant: HANWHA SOLUTIONS CORPORATION, Seoul (KR)

(72) Inventors: Han Woong Jeon, Seoul (KR); Jin Sung Park, Seoul (KR); Keun Ho Kim, Seoul (KR); Young Min Lee, Seoul (KR)

(73) Assignee: Hanwha Solutions Corporation, Seoul (KR)

( * ) Notice: Subject to any disclaimer, the term of this patent is extended or adjusted under 35 U.S.C. 154(b) by 292 days.

(21) Appl. No.: 18/260,063

(22) PCT Filed: Jul. 6, 2022

(86) PCT No.: PCT/KR2022/009798
§ 371 (c)(1),
(2) Date: Jun. 30, 2023

(87) PCT Pub. No.: WO2023/038257
PCT Pub. Date: Mar. 16, 2023

(65) Prior Publication Data
US 2024/0061239 A1 Feb. 22, 2024

(30) Foreign Application Priority Data
Sep. 10, 2021 (KR) ........................ 10-2021-0120868

(51) Int. Cl.
*G02B 27/00* (2006.01)
*G02B 23/24* (2006.01)
(52) U.S. Cl.
CPC ..... *G02B 27/0006* (2013.01); *G02B 23/2492* (2013.01)

(58) Field of Classification Search
CPC ........................ G02B 27/0006; G02B 23/2492
(Continued)

(56) References Cited

U.S. PATENT DOCUMENTS 4,650,540 A * 3/1987 Stoll ........................ C30B 15/30
117/936
9,114,989 B2 * 8/2015 Song ........................ C30B 15/00
(Continued)

FOREIGN PATENT DOCUMENTS

CN 201442989 U 4/2010
CN 101718911 A 6/2010
(Continued)

OTHER PUBLICATIONS

JP-2005093953-A—English translation—Ono—Apr. 2005.*
(Continued)

*Primary Examiner* — Sharrief I Broome
(74) *Attorney, Agent, or Firm* — Harness, Dickey & Pierce, P.L.C.

(57) ABSTRACT

A high-temperature endoscope preventing impurities of an ingot growth apparatus from being deposited, according to one embodiment of the present invention, may comprise: a frame extending to the inside of a chamber of the ingot growth apparatus and having a gas discharge port provided at an end portion thereof through which an inert gas is discharged; a lens installed at the center of the end portion of the frame and protected by the inert gas discharged from the gas discharge port; and a guide tube installed on an outer surface of the frame and having a guide portion extending from the end portion of the frame so as to guide the inert gas to prevent impurities from being deposited on the lens by increasing a flow rate of the inert gas.

7 Claims, 9 Drawing Sheets

20

(58) Field of Classification Search
USPC ........................................................ 359/509
See application file for complete search history.

(56) References Cited

U.S. PATENT DOCUMENTS

| | | | | |
|---|---|---|---|---|
| 2016/0319458 A1* | 11/2016 | Kim | ........................ | C30B 15/26 |
| 2017/0311789 A1* | 11/2017 | Mulcahey | .............. | A61B 1/126 |
| 2023/0374697 A1* | 11/2023 | Lee | ........................ | C30B 29/06 |

FOREIGN PATENT DOCUMENTS

| | | | | |
|---|---|---|---|---|
| JP | H06-182570 | A | | 7/1994 |
| JP | 2001-287072 | A | | 10/2001 |
| JP | 2005093953 | A | * | 4/2005 |
| JP | 2019-516446 | A | | 6/2019 |
| KR | 95-0015654 | U | | 6/1995 |
| KR | 102271830 | B1 | | 7/2021 |

OTHER PUBLICATIONS

International Search Report for International Application No. PCT/KR2022/009798 dated Oct. 6, 2022.
First Office Action issued Dec. 30, 2025 in Chinese Application No. 202280008003.2.

\* cited by examiner

[FIG. 1]
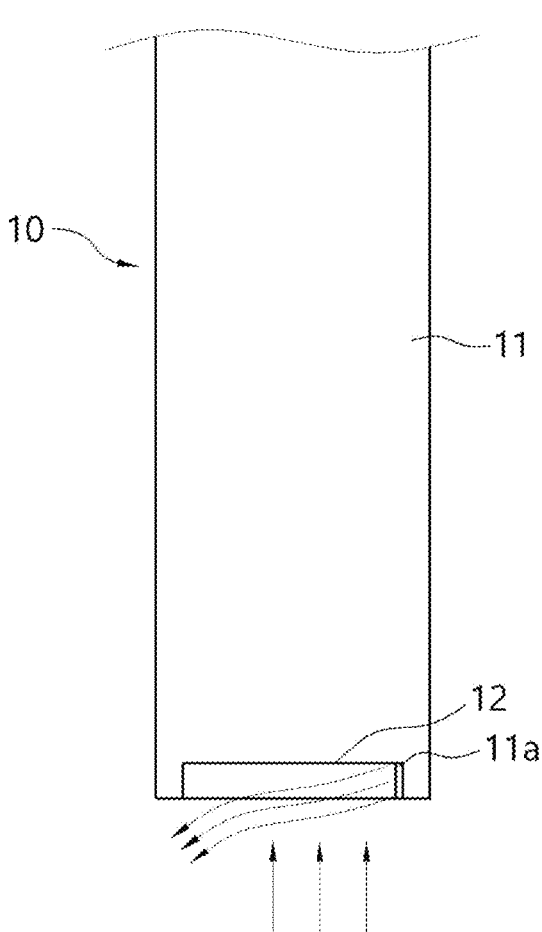

【FIG. 2】
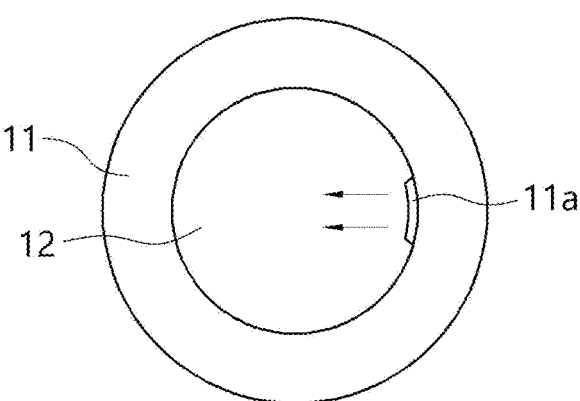

【FIG. 3】
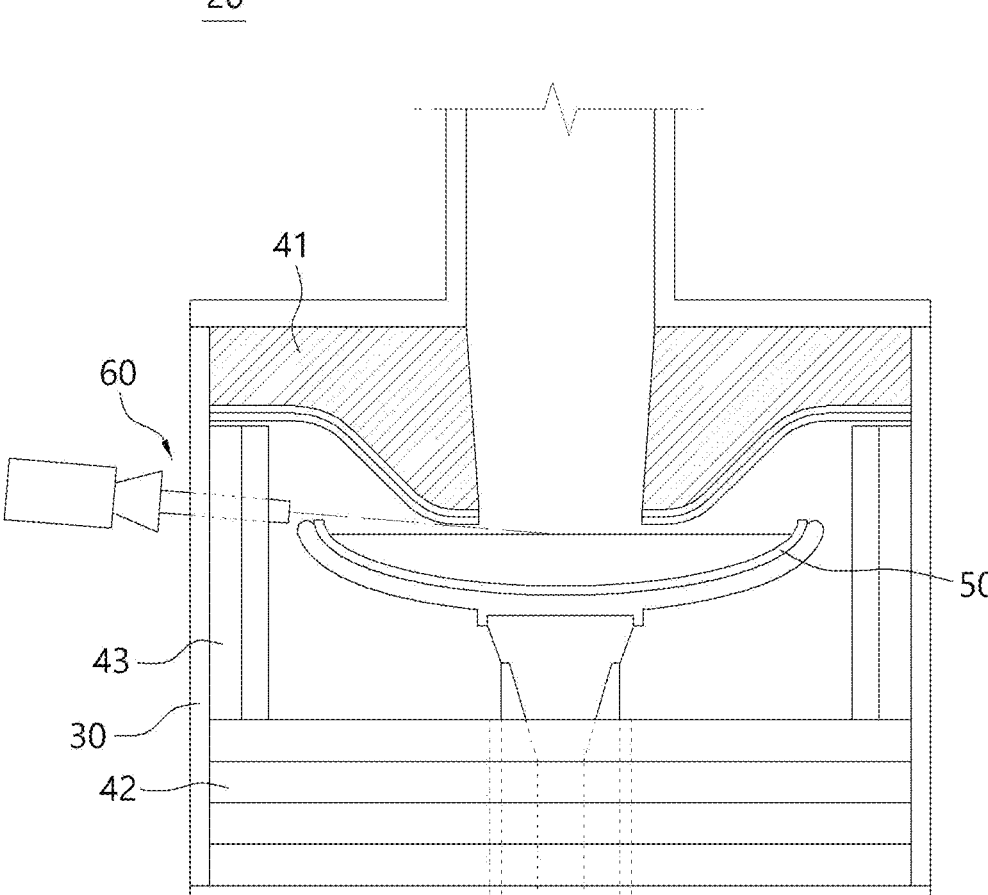

【FIG. 4】
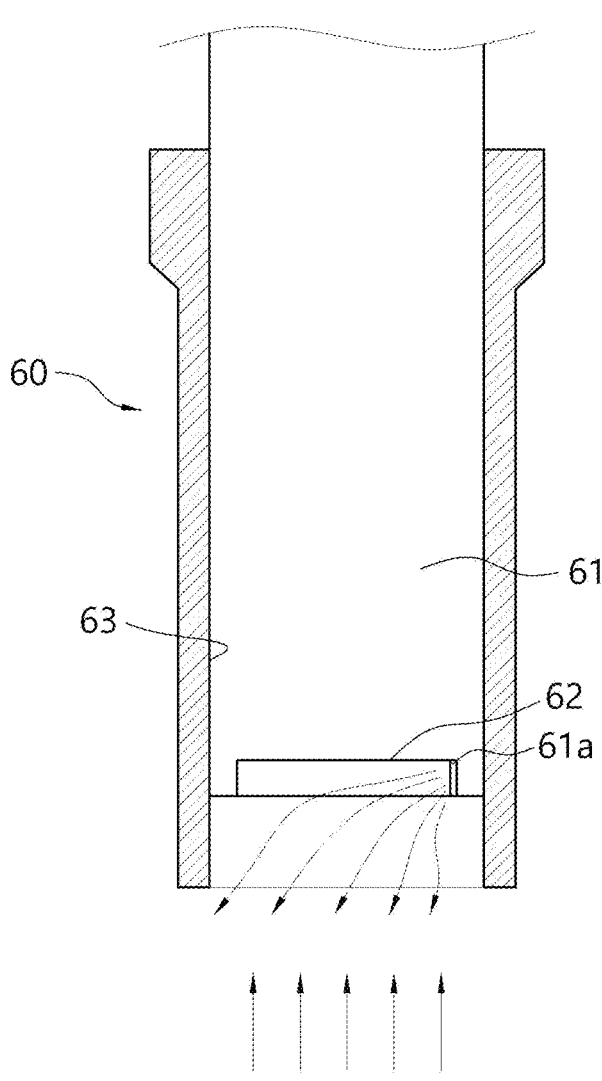

【FIG. 5】
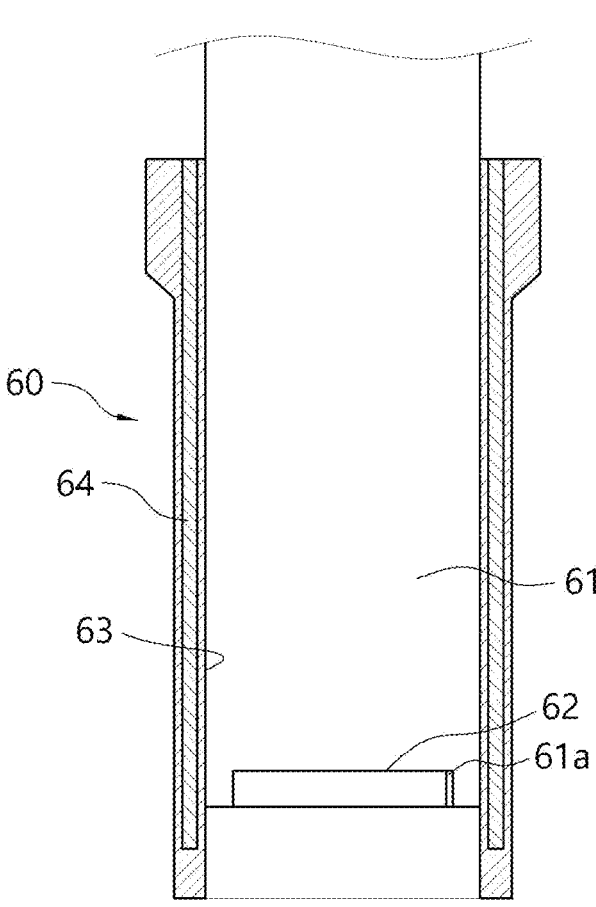

【FIG. 6】
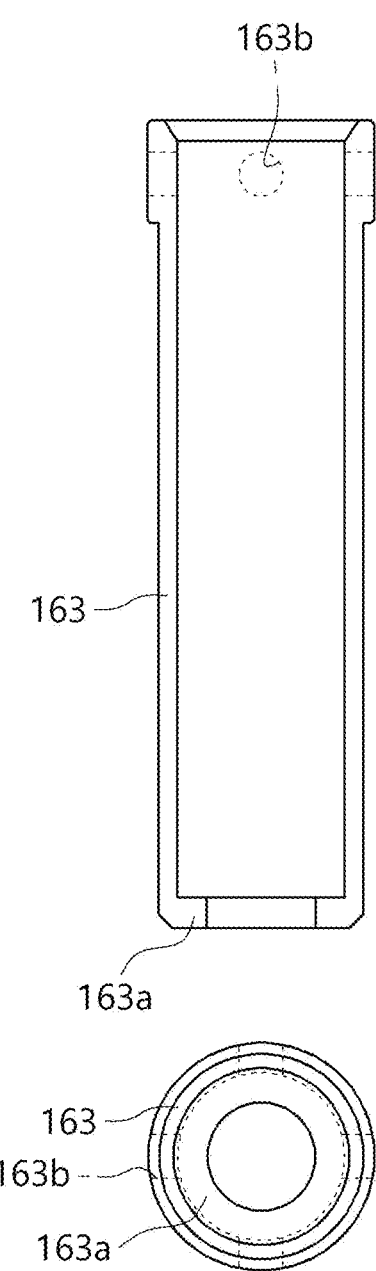

[FIG. 7]
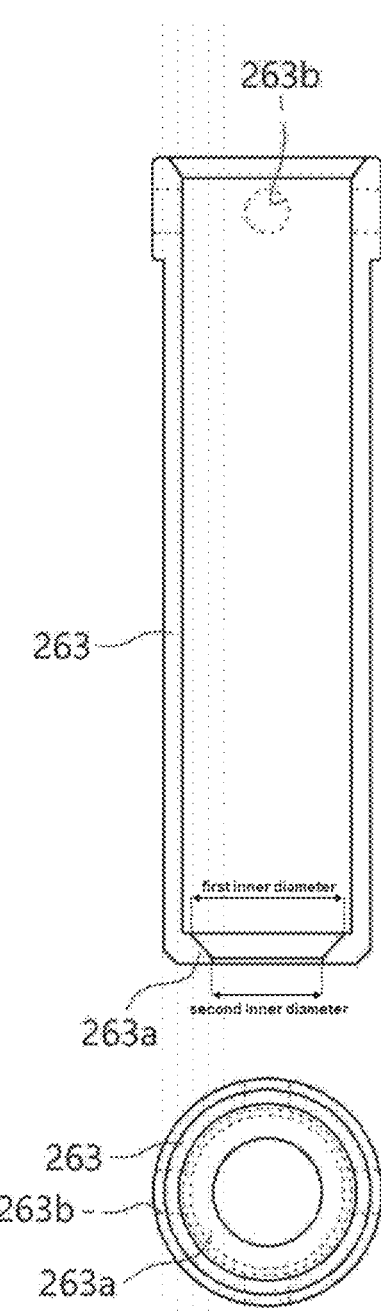

【FIG. 8】
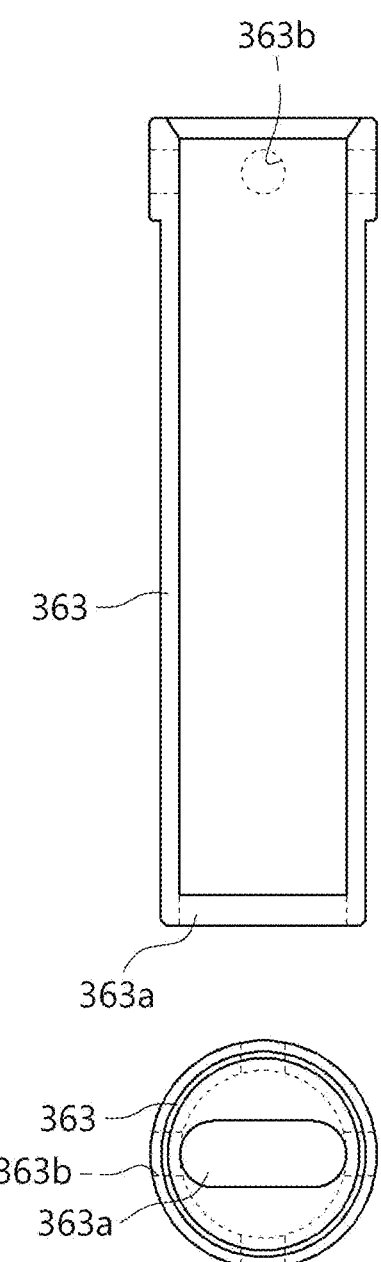

【FIG. 9】
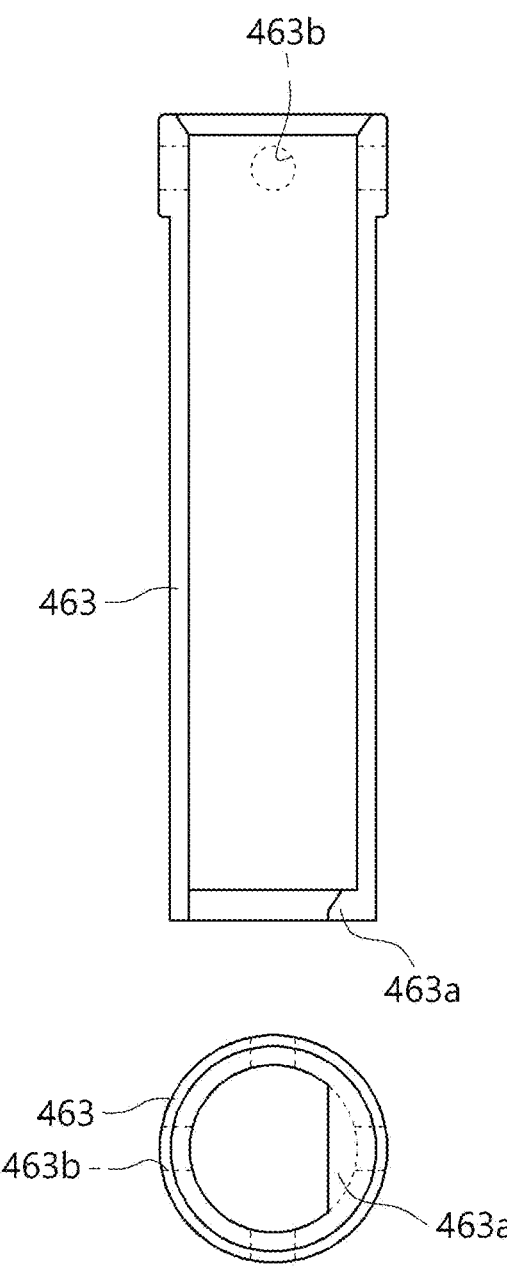

HIGH-TEMPERATURE ENDOSCOPE PREVENTING IMPURITIES OF INGOT GROWTH APPARATUS FROM BEING DEPOSITED

CROSS-REFERENCE TO RELATED APPLICATIONS

This application is a national phase under 35 U.S.C. § 371 of PCT International Application No. PCT/KR2022/009798 which has an International filing date of Jul. 6, 2022, which claims priority to Korean Application No. 10-2021-0120868, filed Sep. 10, 2021, the entire contents of each of which are hereby incorporated by reference.

TECHNICAL FIELD

The present invention relates to a high-temperature endoscope of an ingot growth apparatus, and more specifically to a high-temperature endoscope of an ingot growth apparatus in which impurity deposition is prevented by having a structure for increasing the flow rate of an inert gas to prevent impurity deposition.

BACKGROUND ART

In general, a grower using the Czochralski method uses a vision camera such as CCD and the like and a sensor for diameter measurement (laser sensor, etc.) to measure the diameter of an ingot and the melt level of silicon melted inside the crucible, and these measure the diameter of a growing ingot or the height level of molten silicon through a view port installed on the top or side portion of a chamber.

In the conventional ingot growth apparatus, it is a method commonly used in the field of single crystal growth to measure the diameter of crystals inside the equipment by installing an industrial camera outside the port. In the case of using this method, in order to secure a field of view, a field of view must be secured from the monitoring port outside a crystal growth apparatus to the crystal growth area inside a single crystal growth apparatus without interference from internal structures. This causes a lot of heat energy loss and brings restrictions on the structural design corresponding to the viewing path.

In order to prevent heat energy loss of the conventional ingot growth apparatus, an endoscopic monitoring system which is applicable to high heat is applied. This is a structure that secures only a minimum space up to the area where crystals grow, and it can reinforce a large amount of insulating materials compared to the existing method. Therefore, it has a function of reducing power consumption by strengthening the insulation performance.

In the case of an industrial camera that is commonly used in the field of single crystal growth, the high-temperature endoscope of an ingot growth apparatus according to the related art does not directly affect the camera lens when impurities generated inside the apparatus are installed outside the equipment. However, in the case of a high-temperature endoscope 10 in which the conventional equipment is installed inside the growth furnace, the endoscope device is located inside the growth furnace and is easily exposed to lens contamination by impurities, because it is used for a long period of time. In order to solve this problem, there is a separate gas discharge port 11a in a frame 11 that supplies inert gas to the front of the endoscope on the surface of lens 12 of the high-temperature endoscope 10, but it is a structure that is not suitable to be applied to this process in which excessive pollutants are generated. In addition, referring to FIGS. 1 and 2, since the front gas discharge port 11a does not include a function of enhancing the gas flow rate and simply blows gas toward the lens 12 from the end portion of the frame 11, there is a problem over time in that the lens 12 is contaminated by the deposition and accumulation of impurities.

DISCLOSURE

Technical Problem

According to the present invention, by installing a guide to increase the flow rate of an inert gas which is sprayed from the end of the endoscope to prevent impurities from being deposited on the lens, it is directed to providing a high-temperature endoscope for preventing impurities from being deposited in which impurity deposition is prevented in an ingot growth apparatus.

Technical Solution

The high-temperature endoscope for preventing impurities of an ingot growth apparatus from being deposited according to an aspect of the present invention may include a frame extending to the inside of a chamber of the ingot growth apparatus and having a gas discharge port provided at an end portion thereof through which an inert gas is discharged; a lens installed at the center of the end portion of the frame and protected by the inert gas discharged from the gas discharge port; and a guide tube installed on an outer surface of the frame and having a guide portion extending from the end portion of the frame so as to guide the inert gas to prevent impurities from being deposited on the lens by increasing a flow rate of the inert gas.

In this case, at least one gas discharge port may be installed at one side of an end portion of the frame, and be disposed such that the direction of the discharged gas faces toward the center of the lens.

In this case, a heat insulating material for insulating the frame may be installed on the guide tube such that the impurity deposition of an ingot growth apparatus can be prevented.

In this case, the guide tube may be inserted into the outer surface of the frame, and have a plurality of piece holes formed at the top to be assembled and disassembled by a plurality of pieces in the frame.

In this case, a reduced diameter portion having a reduced inner diameter may be formed at an end portion of the guide tube such that the impurity deposition of an ingot growth apparatus can be prevented.

In this case, the inner diameter of the reduced diameter portion of the guide tube may be linearly reduced toward the end portion.

In this case, the guide tube may have an end portion in the form of a long hole on a plane.

In this case, the guide tube may have a one-way protrusion formed to protrude inward on one side at the end portion.

In this case, the one-way protrusion of the guide tube may be installed in front of the gas discharge port such that the discharged inert gas collides with the opposite partition wall to form a vortex.

Advantageous Effects

According to the above configuration, since the high-temperature endoscope in which impurity deposition is prevented in the ingot growth apparatus according to the present invention is guided by a guide tube to increase the flow rate of an inert gas, it is possible to prevent impurities from being deposited on the lens.

In addition, in the high-temperature endoscope in which impurity deposition is prevented in the ingot growth apparatus according to the present invention, heat loss caused by the high-temperature endoscope can be supplemented by installing an insulating material in the guide tube.

DESCRIPTION OF DRAWINGS

FIG. 1 is a configuration diagram of the end portion of a high-temperature endoscope of an ingot growth apparatus according to the related art.

FIG. 2 is a plan view of the end portion of a high-temperature endoscope illustrated in FIG. 1.

FIG. 3 is a cross-sectional configuration diagram of an ingot growth apparatus equipped with a high-temperature endoscope in which impurity deposition is prevented according to the present invention.

FIG. 4 is a cross-sectional view of the end portion of a high-temperature endoscope in which impurity deposition is prevented in an ingot growth apparatus according to the first example of the present invention.

FIG. 5 is a cross-sectional view of the end portion of a high-temperature endoscope in which impurity deposition is prevented in an ingot growth apparatus according to the second example of the present invention.

FIG. 6 is a cross-sectional view and a plan view of a high-temperature endoscope in which impurity deposition is prevented in an ingot growth apparatus according to the third example of the present invention.

FIG. 7 is a cross-sectional view and a plan view of a high-temperature endoscope in which impurity deposition is prevented in an ingot growth apparatus according to the fourth example of the present invention.

FIG. 8 is a cross-sectional view and a plan view of a high-temperature endoscope in which impurity deposition is prevented in an ingot growth apparatus according to the fifth example of the present invention.

FIG. 9 is a cross-sectional view and a plan view of a high-temperature endoscope in which impurity deposition is prevented in an ingot growth apparatus according to the sixth example of the present invention.

MODES OF THE INVENTION

Terms and words used in the present specification and claims should not be construed as limited to their usual or dictionary definition, and they should be interpreted as a meaning and concept consistent with the technical idea of the present invention based on the principle that inventors may appropriately define the terms and concept in order to describe their own invention in the best way.

Accordingly, the exemplary embodiments described in the present specification and the configurations shown in the drawings correspond to preferred exemplary embodiments of the present invention, and do not represent all the technical spirit of the present invention, and thus, the configurations may have various examples of equivalent and modification that can replace them at the time of filing the present invention.

It is understood that the terms "include" or "have", when used in the present specification, are intended to describe the presence of stated features, integers, steps, operations, elements, components and/or a combination thereof but do not preclude the possibility of the presence or addition of one or more other features, integers, steps, operations, elements, components or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Hereinafter, the high-temperature endoscope 60 according to the present invention in which impurity deposition of an ingot growth apparatus 20 is prevented will be described with reference to the drawings.

Referring to FIG. 3, the cross-sectional configuration of an ingot growth apparatus 20 equipped with a high-temperature endoscope 60 according to the present invention is illustrated. A growth furnace 50 is installed inside a vacuum chamber 30, and single crystals grow in the center. A heater is installed to be in close contact with the growth furnace 30, and an upper insulator 41, a lower insulator 42 and a side insulator 43 are installed to minimize heat loss. Heat loss is a very important factor because it directly affects the unit cost of a product. Therefore, it is very important to minimize heat loss.

In this case, on the side surface of the vacuum chamber 30 of the ingot growth apparatus 20, a high-temperature endoscope 60 is installed through the vacuum chamber 30 and the insulating material 43 on the side surface such that the ingot growth inside can be observed.

In this case, the high-temperature endoscope 60 has a form in which a lens 62 is installed at an end portion of a frame 61, which is a long extension member in the form of a pipe.

Referring to FIGS. 3 and 4, the high-temperature endoscope 60 in which impurity deposition is prevented in the ingot growth apparatus according to the first example of the present invention may include a frame 61, a lens 62 and a guide tube 63.

Referring to FIGS. 3 and 4, the frame 61 may extend to the inside of the chamber 30 of the ingot growth apparatus 20 and may have a gas discharge port 61*a* through which an inert gas is discharged at an end portion thereof.

In this case, the frame 61 extends to the vicinity of the growth furnace 50 through the vacuum chamber 30 and through the insulating material 43 on the side surface as well. It may be installed adjacent to the growth furnace 50 such that the diameter and state of a single crystal ingot growing inside the growth furnace 50 may be visually grasped.

In this case, since the frame 61 is installed through the vacuum chamber 30 and the insulating material 43 on the side surface, it is difficult to prevent heat loss even if it occupies a small space and area.

In this case, electronic components such as an image sensor and the like may be installed behind the frame 61 to obtain an image through the lens 62.

In this case, a cooling jacket may be formed in the frame 61 to maintain the temperature inside the high-temperature chamber 30 below a certain level, and cooling equipment may be connected thereto.

In this case, a gas passage is formed to the end portion of the frame 61, and argon gas, which is an inert gas, may be supplied at a certain pressure through a gas discharge port 61a formed at the end portion. Due to the provision of such an inert gas, the deposition of impurities on the lens 62 can be prevented as much as possible.

In this case, the frame 61 is an extension member and may be formed in a pipe shape, and an image through the lens 62 may be provided to a rear image sensor through a central hole of the frame 61.

Referring to FIGS. 3 and 4, the lens 62 is installed at the center of the end portion of the frame 61, and it may be protected by an inert gas which is discharged from the gas discharge port 61a. Conventionally, since the ingot growth apparatus uses the growth furnace 50 made of quartz in terms of process structure, impurities of $SiO_x$ are generated inside during the working process.

In this case, if the deposition of impurities on the lens 62 is not prevented by the active gas, impurities are deposited on the surface of the lens 62 in a short period of time, and cleaning or replacement of the lens 62 may have to be repeated.

In this case, at least one gas discharge port 61a may be installed at one side of an end portion of the frame 61, and the direction of the discharged gas may be disposed toward the center of the lens 62. Herein, one gas discharge port 61a is formed, and the inert gas discharged through the gas discharge port 61a passes through the center direction of the lens 62 and is disposed to be discharged to the opposite side. Certainly, this flow of gas will be operated simultaneously when ingot growth begins and will continue until the work is completed.

When the ingot grows in this state, impurities are generated in the growth furnace 50, the impurities will flow inside the chamber 30 according to the flow of the fluid, and the impurities will also come into contact with the lens 62. In this case, due to the temperature and material, a part thereof is deposited on the lens 62, making it impossible to obtain a clear image. However, before the impurities come into contact with the lens 62, a large part thereof will move away from the lens 62 along the flow of the inert gas, thereby preventing deposition.

In this case, it is difficult for some of the impurities to cover the entire flow of the inert gas, and it is difficult to completely separate all impurities or heavy impurities from the lens 62 at a high flow rate of the inert gas. Therefore, a high flow rate and a large amount of inert gas flow can almost treat various impurities such that they do not come into contact with the lens 62. However, since problems such as heat loss and the like occur when an excessively high pressure and a large amount of inert gas are supplied, a structure for preventing the deposition of impurities while maintaining the amount and pressure of inert gas supplied is required. This structure is achieved by a guide tube 63.

Referring to FIGS. 3 and 4, the guide tube 63 is installed on the outer surface of the frame 61, and a guide portion extending from an end portion of the frame 61 is formed to guide the inert gas to increase the flow rate, and thus, it is possible to prevent impurities from being deposited on the lens 62.

In this case, the guide tube 63 is inserted into the outer surface of the frame 61, and a plurality of piece holes 163b to 463b are formed at the top such that the frame 61 can be assembled and disassembled by a plurality of pieces. Herein, it can be assembled and attached in the form of forming about 3 to 4 piece holes and fastening or pressing to the frame 61 by means of bolts.

In this case, since the guide tube 63 must maintain a state of being attached to the outer surface of the frame 61 without deformation at high temperatures, materials that are resistant to high temperatures such as graphite, ceramics and molybdenum may be used.

In this case, the high-temperature endoscope 60 of the ingot growth apparatus in which the guide tube 63 is installed is formed with a guide portion having a certain length from the lens 62 at a position where the gas discharge port 61a is formed, the inert gas discharged through the gas discharge port 61a has a fluid flow of passing through the front part of the lens 62 to the opposite partition wall, flowing along the guide portion to the end portion of the guide tube 63, and then exiting the guide tube 63. Therefore, since the inert gas flows in turn while the inert gas is filled in a space as large as the length of the guide portion, in order for the impurities to come into contact with the lens 62, they must pass through the flow of the inert gas filling the guide portion, and thus, since it is difficult for the impurities to penetrate to the surface of the lens 62, the deposition of impurities on the lens 62 may be prevented more reliably.

Referring to FIG. 3, an ingot growth apparatus 20 to which the high-temperature endoscope 60 in which impurity deposition is prevented according to the first example of the present invention is applied is illustrated. The growth furnace 50 is installed inside the chamber 20, and insulators 41, 42, 43 are installed on the top, side and bottom. The frame 61 of the high-temperature endoscope 60 passes through the side surface of the chamber 20 and is installed up to the vicinity of the growth furnace 50, and through the lens 62 installed at the end portion of the frame 61, a field of view is secured such that the diameter and state of the growing ingot can be checked. Therefore, a large amount of impurities generated in the growth furnace 50 may directly flow toward the lens 62.

Referring to FIG. 4, an end portion of the high-temperature endoscope 60 in which impurity deposition is prevented according to the first example of the present invention is illustrated. A guide tube 63 is assembled to the end portion of the frame 61 of the high-temperature endoscope 60. The guide portion of the guide tube 63 protects the lens 62 in a form of extending a predetermined length from the lens 62. Certainly, as the inert gas is discharged through the gas discharge port 61a of the frame 61, the guide portion is filled, and therefore, impurities flowing toward the lens 62 fail to pass through the inert gas filling the guide portion and are discharged back to the opposite side of the lens 62, thereby securely preventing impurities from being deposited on the surface of the lens 62.

Referring to FIG. 5, the high-temperature endoscope 60 in which impurity deposition is prevented according to the second example of the present invention is illustrated. The difference from the previous example is that an insulating material 64 for insulating the frame 61 is installed in the guide tube 63.

In this case, by installing the heat insulating material 64 on the guide tube 63, the heat insulating performance of the frame 61 may be improved.

In this case, in the case of a high-temperature endoscope including a water cooling system, the loss of ambient thermal energy may occur. In order to prevent this, an insulating material 64 may be inserted into the outer surface of the guide tube 63 to reduce heat energy loss, and it may have the structure of a guide tube 63 that is safely used even in a high temperature region.

Referring to FIG. 6, a guide tube 163 of the high-temperature endoscope in which impurity deposition is prevented according to the third example of the present invention is illustrated. A reduced diameter portion 163a having a reduced inner diameter may be formed at an end portion of the guide tube 163.

In this case, the inert gas is guided by the guide portion of the guide tube 163, and the reduced diameter portion 163a having a reduced inner diameter is formed at the end portion of the guide portion, and the shape of the reduced diameter portion 163a amplifies the vortex of the injected inert gas, and at the same time, it is possible to add a function of increasing the flow rate according to Bernoulli's Principle through the narrow passage.

Referring to FIG. 7, a guide tube 263 of the high-temperature endoscope in which impurity deposition is prevented according to the fourth example of the present invention is illustrated. The inner diameter of the reduced diameter portion 263a of the guide tube 263 is linearly reduced toward the end portion. That is, it is designed to play a role of facilitating the flow of the injected inert gas by processing the end portion of the guide portion in an oblique shape on the cross-section.

Referring to FIG. 8, a guide tube 363 of the high-temperature endoscope in which impurity deposition is prevented according to the fifth example of the present invention is illustrated. The guide tube 363 may have an end portion in the form of a long hole 363a on a plane. By having the shape of the long hole 363a in this way, it is possible to monitor only the diameter and the observed local area of the functional crystal.

Referring to FIG. 9, a guide tube 463 of the high-temperature endoscope in which impurity deposition is prevented according to the sixth example of the present invention is illustrated. The guide tube 463 may have a one-way protrusion 463a protruding inward at one side at an end portion thereof. In this case, the one-way protrusion 463a of the guide tube 463 is installed in front of the gas discharge port 61a, and the discharged inert gas collides with the opposite partition wall to form a vortex. Deposition due to the penetration of impurities may be further prevented by the increased vortex flow of the inert gas.

Although the exemplary embodiments of the present invention have been described, the spirit of the present invention is not limited by the exemplary embodiments presented herein, and a person skilled in the art who understands the spirit of the present invention may easily suggest other exemplary embodiments by modifying, changing, deleting or adding components within the scope of the same spirit, but this will also be within the spirit of the present invention.

INDUSTRIAL APPLICABILITY

The present invention can be applied to an ingot growth apparatus.

The invention claimed is:

1. A high-temperature endoscope for preventing impurities of an ingot growth apparatus from being deposited, comprising:
    a frame extending to the inside of a chamber of the ingot growth apparatus and having at least one gas discharge port provided at an end portion thereof through which an inert gas is discharged;
    a lens installed at the center of the end portion of the frame and protected by the inert gas discharged from the at least one gas discharge port; and
    a guide tube installed on an outer surface of the frame and having a guide portion extending from the end portion of the frame so as to guide the inert gas to prevent impurities from being deposited on the lens by increasing a flow rate of the inert gas,
    wherein an inner surface of an end portion of the guide tube has a reduced diameter portion protruding toward a longitudinal central axis of the guide tube,
    wherein the reduced diameter portion has an inner diameter linearly reduced from a first diameter to a second diameter toward the end portion of the guide tube,
    wherein an inner diameter of the guide tube at a position where the lens is located is relatively greater than the first diameter of the reduced diameter portion, and
    wherein a difference between the inner diameter of the guide tube at the position where the lens is located and the first diameter is relatively smaller than a difference between the first diameter and the second diameter.

2. The high-temperature endoscope of claim 1, wherein the at least one gas discharge port is installed at one side of the end portion of the frame, and is disposed such that the direction of the discharged gas faces toward the center of the lens.

3. The high-temperature endoscope of claim 1, wherein a heat insulating material for insulating the frame is installed on the guide tube.

4. The high-temperature endoscope of claim 1, wherein the guide tube is inserted into the outer surface of the frame, and has a plurality of piece holes formed at the top to be assembled and disassembled by a plurality of pieces in the frame.

5. The high-temperature endoscope of claim 1, wherein the end portion of the guide tube has the form of a long hole on a plane.

6. The high-temperature endoscope of claim 1, wherein the guide tube has a one-way protrusion formed to protrude inward on one side at the end portion.

7. The high-temperature endoscope of claim 6, wherein the one-way protrusion of the guide tube is installed in front of the at least one gas discharge port such that the discharged inert gas collides with the opposite partition wall to form a vortex.

* * * * *